(12) United States Patent
Ray et al.

(10) Patent No.: US 11,463,688 B2
(45) Date of Patent: Oct. 4, 2022

(54) JOINT CHROMA RESIDUAL VIDEO CODING

(71) Applicant: QUALCOMM Incorporated, San Diego, CA (US)

(72) Inventors: Bappaditya Ray, San Diego, CA (US); Geert Van der Auwera, Del Mar, CA (US); Adarsh Krishnan Ramasubramonian, Irvine, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/115,544

(22) Filed: Dec. 8, 2020

(65) Prior Publication Data
US 2021/0176464 A1    Jun. 10, 2021

Related U.S. Application Data

(60) Provisional application No. 62/945,750, filed on Dec. 9, 2019.

(51) Int. Cl.
*H04N 19/107* (2014.01)
*H04N 19/159* (2014.01)
(Continued)

(52) U.S. Cl.
CPC ......... *H04N 19/107* (2014.11); *H04N 19/159* (2014.11); *H04N 19/176* (2014.11); *H04N 19/186* (2014.11); *H04N 19/96* (2014.11)

(58) Field of Classification Search
CPC .. H04N 19/105; H04N 19/107; H04N 19/159; H04N 19/167; H04N 19/176;
(Continued)

(56) References Cited

U.S. PATENT DOCUMENTS 9,648,330 B2 * 5/2017 Pu .................... H04N 19/61
11,095,922 B2 * 8/2021 Zhang .................. H04N 19/17
(Continued)

FOREIGN PATENT DOCUMENTS

EP    3684055 A1    7/2020
WO    2019054200 A1    3/2019

OTHER PUBLICATIONS

Chen J., et al., "Algorithm Description of Joint Exploration Test Model 7 (JEM7)," JVET-G1001-V1, Joint Video Exploration Team (JVET) of ITU-T SG 16 WP3 and ISO/IEC JTC 1/SC 29/WG 11, 7th Meeting, Jul. 13, 2017-Jul. 21, 2017, Torino, Aug. 19, 2017 (Aug. 19, 2017), XP030150980,48 Pages, pp. i-iv, Retrieved from the Internet: URL: http://phenix.int-evry.fr/jvet/doc_end_user/documents/7_Torino/wg11/JVET-G0001-v1.zip.
(Continued)

*Primary Examiner* — Md N Haque
(74) *Attorney, Agent, or Firm* — Shumaker & Sieffert, P.A.

(57) ABSTRACT

A video decoder can be configured to receive, for a first chroma component of a block of the video data, information for first residual samples that correspond to a difference between a first chroma block of the first chroma component and a first prediction block of the first chroma component; determine intermediate reconstructed samples based on the first residual samples; receive, for a second chroma component of the block of video data, information for second residual samples that correspond to a difference between a second chroma block of the second chroma component and the intermediate reconstructed samples; reconstruct the first chroma block based on the first residual samples and the first prediction block; reconstruct the second chroma block based on the second residual samples and the intermediate reconstructed samples; and output decoded video data comprising
(Continued)

the reconstructed first chroma block and the reconstructed second chroma block.

30 Claims, 8 Drawing Sheets

(51) Int. Cl.
*H04N 19/176* (2014.01)
*H04N 19/186* (2014.01)
*H04N 19/96* (2014.01)

(58) Field of Classification Search
CPC ...... H04N 19/186; H04N 19/50; H04N 19/61; H04N 19/96
See application file for complete search history.

(56) References Cited

U.S. PATENT DOCUMENTS

| | | | |
|---|---|---|---|
| 2014/0219347 A1 | 8/2014 | Xu et al. | |
| 2015/0124865 A1* | 5/2015 | Kim | H04N 19/105 375/240.12 |
| 2020/0128272 A1* | 4/2020 | Jangwon | H04N 19/157 |

OTHER PUBLICATIONS

International Search Report and Written Opinion—PCT/US2020/063943—ISA/EPO—dated Mar. 16, 2021 17 Pages.
Bross B., et al., "AHG18: Enabling Lossless Coding with Minimal Impact on VVC Design", JVET-P0606-v2, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-6.
Bross B., et al., "AHG18: Two Stage Residual Coding for Lossless", JVET -P0607-v2, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-3.
Bross B., et al., "Versatile Video Coding {Draft 6)", 127th MPEG Meeting, Jul. 8, 2019-Jul. 12, 2019, Gothenburg, (Motion Picture Expert Group or JVET of ISO/IEC JTC1/SC29/WG11 and ITU-T SG 16 WP 3), JVET-O2001-vD, No. m49908, Jul. 29, 2019 (Jul. 29, 2019), XP030208567, 471 pages, Retrieved from the Internet: URL: http://phenix.int-evry.fr/mpeg/doc_end_user/documents/127_Gothenburg/wg11/m49908-JVET-O2001-v13-JVET-O2001-vD.zip. JVET-O2001-vD.docx [retrieved on Jul. 29, 2019] section 7.3.8.6 section 7.4.9.6.
Bross B., et al., "Versatile Video Coding (Draft 7)", Joint Video Experts Team (JVET) of ITU-T SG 16 WP 3 and ISO/IEC JTC 1/SC 29/WG 11, JVET-P2001-vE, 16th Meeting, Geneva, CH, Oct. 1-11, 2019, 494 pages.
Helmrich C., et al., "CE7: Joint chroma Residual Coding with Multiple Modes {tests CE7-2.1, CE7-2.2)", Joint Video Experts Team (JVET) of ITU-T SG 16 WP 3 and ISO/IEC JTC 1/SC 29/WG 11, JVET-O0105-V2, 15th Meeting,Gothenburg, SE, Jul. 3-12, 2019, 9 pages.
Helmrich C., et al., "CE7-related: Alternative Configuration for Joint Chroma Residual Coding", JVET-O0543-v2, Joint Video Experts Team (JVET) of ITU-T SG 16 WP 3 and ISO/IEC JTC 1/SC 29/WG 11, 15th Meeting, Gothenburg, SE, Jul. 3-12, 2019, pp. 1-8.
Itu-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.
Xu L., et al., "CE8-related: A SPS Level Flag for BDPCM and JCCR", JVET-O0376-v3, Joint Video Experts Team (JVET) of ITU-T SG 16 WP 3 and ISO/IEC JTC 1/SC 29/WG 11, 15th Meeting, Gothenburg, SE, Jul. 3-12, 2019, pp. 1-4.

\* cited by examiner

JOINT CHROMA RESIDUAL VIDEO CODING

This application claims the benefit of U.S. Provisional Patent Application 62/945,750, filed 9 Dec. 2019, the entire content being incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for joint coding of chroma residuals (JCCR). In JCCR, the residual chroma blocks (e.g., difference between chroma blocks and respective chroma prediction blocks) are coded together (e.g., one residual block is coded for the residual chroma blocks). In some examples, JCCR may result in lossy coding, and therefore JCCR may be disabled when lossless coding is enabled. However, there may be benefits to the video quality by utilizing lossless coding or at least less lossy coding. This disclosure describes examples of techniques for JCCR with lossless or less lossy coding, thereby allowing for the benefits of less lossy coding while achieving at least some of the benefits (e.g., reduction in amount of residual information that is signaled) of JCCR.

According to one example, a method of decoding video data includes receiving information for first residual samples for a first chroma component of a block of the video data, wherein the first residual samples correspond to a difference between a first chroma block of the first chroma component and a first prediction block of the first chroma component; determining intermediate reconstructed samples based on the first residual samples; receiving information for second residual samples for a second chroma component of the block of video data, wherein the second residual samples correspond to a difference between a second chroma block of the second chroma component and the intermediate reconstructed samples; reconstructing the first chroma block based on the first residual samples and the first prediction block; reconstructing the second chroma block based on the second residual samples and the intermediate reconstructed samples; and outputting decoded video data comprising the reconstructed first chroma block and the reconstructed second chroma block.

According to another example, a method includes determining first residual samples for a first chroma component of a block of the video data, wherein the first residual samples correspond to a difference between a first chroma block of the first chroma component and a first prediction block of the first chroma component; determining intermediate reconstructed samples based on the first residual samples and a second prediction block of the second chroma component; determining second residual samples for the second chroma component of the block of video data, wherein the second residual samples correspond to a difference between a second chroma block of the second chroma component and the intermediate reconstructed samples; and outputting, in a bitstream of encoded video data, syntax elements representing the first residual samples and the second residual samples.

According to another example, a device for decoding video data includes a memory configured to store the video data and one or more processors implemented in circuitry and configured to receive information for first residual samples for a first chroma component of a block of the video data, wherein the first residual samples correspond to a difference between a first chroma block of the first chroma component and a first prediction block of the first chroma component; determine intermediate reconstructed samples based on the first residual samples; receive information for second residual samples for a second chroma component of the block of video data, wherein the second residual samples correspond to a difference between a second chroma block of the second chroma component and the intermediate reconstructed samples; reconstruct the first chroma block based on the first residual samples and the first prediction block; reconstruct the second chroma block based on the second residual samples and the intermediate reconstructed samples; and output decoded video data comprising the reconstructed first chroma block and the reconstructed second chroma block.

According to another example, a device for encoding video data includes a memory configured to store video data and one or more processors implemented in circuitry and configured to determine first residual samples for a first chroma component of a block of the video data, wherein the first residual samples correspond to a difference between a first chroma block of the first chroma component and a first prediction block of the first chroma component; determine intermediate reconstructed samples based on the first residual samples and a second prediction block of the second chroma component; determine second residual samples for the second chroma component of the block of video data, wherein the second residual samples correspond to a difference between a second chroma block of the second chroma component and the intermediate reconstructed samples; and output, in a bitstream of encoded video data, syntax elements representing the first residual samples and the second residual samples.

According to another example, a computer-readable storage medium stores instructions that when executed by one or more processors cause the one or more processors to receive information for first residual samples for a first chroma component of a block of the video data, wherein the first residual samples correspond to a difference between a first chroma block of the first chroma component and a first prediction block of the first chroma component; determine intermediate reconstructed samples based on the first residual samples; receive information for second residual samples for a second chroma component of the block of video data, wherein the second residual samples correspond to a difference between a second chroma block of the second chroma component and the intermediate reconstructed samples; reconstruct the first chroma block based on the first residual samples and the first prediction block; reconstruct the second chroma block based on the second residual samples and the intermediate reconstructed samples; and output decoded video data comprising the reconstructed first chroma block and the reconstructed second chroma block.

According to another example, a computer-readable storage medium stores instructions that when executed by one or more processors cause the one or more processors to determine first residual samples for a first chroma component of a block of the video data, wherein the first residual samples correspond to a difference between a first chroma block of the first chroma component and a first prediction block of the first chroma component; determine intermediate reconstructed samples based on the first residual samples and a second prediction block of the second chroma component; determine second residual samples for the second chroma component of the block of video data, wherein the second residual samples correspond to a difference between a second chroma block of the second chroma component and the intermediate reconstructed samples; and output, in a bitstream of encoded video data, syntax elements representing the first residual samples and the second residual samples.

According to another example, an apparatus for decoding video data includes means for receiving information for first residual samples for a first chroma component of a block of the video data, wherein the first residual samples correspond to a difference between a first chroma block of the first chroma component and a first prediction block of the first chroma component; means for determining intermediate reconstructed samples based on the first residual samples; means for receiving information for second residual samples for a second chroma component of the block of video data, wherein the second residual samples correspond to a difference between a second chroma block of the second chroma component and the intermediate reconstructed samples; means for reconstructing the first chroma block based on the first residual samples and the first prediction block; means for reconstructing the second chroma block based on the second residual samples and the intermediate reconstructed samples; and means for outputting decoded video data comprising the reconstructed first chroma block and the reconstructed second chroma block.

According to another example, an apparatus for encoding video data includes means for determining first residual samples for a first chroma component of a block of the video data, wherein the first residual samples correspond to a difference between a first chroma block of the first chroma component and a first prediction block of the first chroma component; means for determining intermediate reconstructed samples based on the first residual samples and a second prediction block of the second chroma component; means for determining second residual samples for the second chroma component of the block of video data, wherein the second residual samples correspond to a difference between a second chroma block of the second chroma component and the intermediate reconstructed samples; and means for outputting, in a bitstream of encoded video data, syntax elements representing the first residual samples and the second residual samples.

The details of one or more examples are set forth in the accompanying drawings and the description below. Other features, objects, and advantages will be apparent from the description, drawings, and claims.

DETAILED DESCRIPTION

Figure 1:
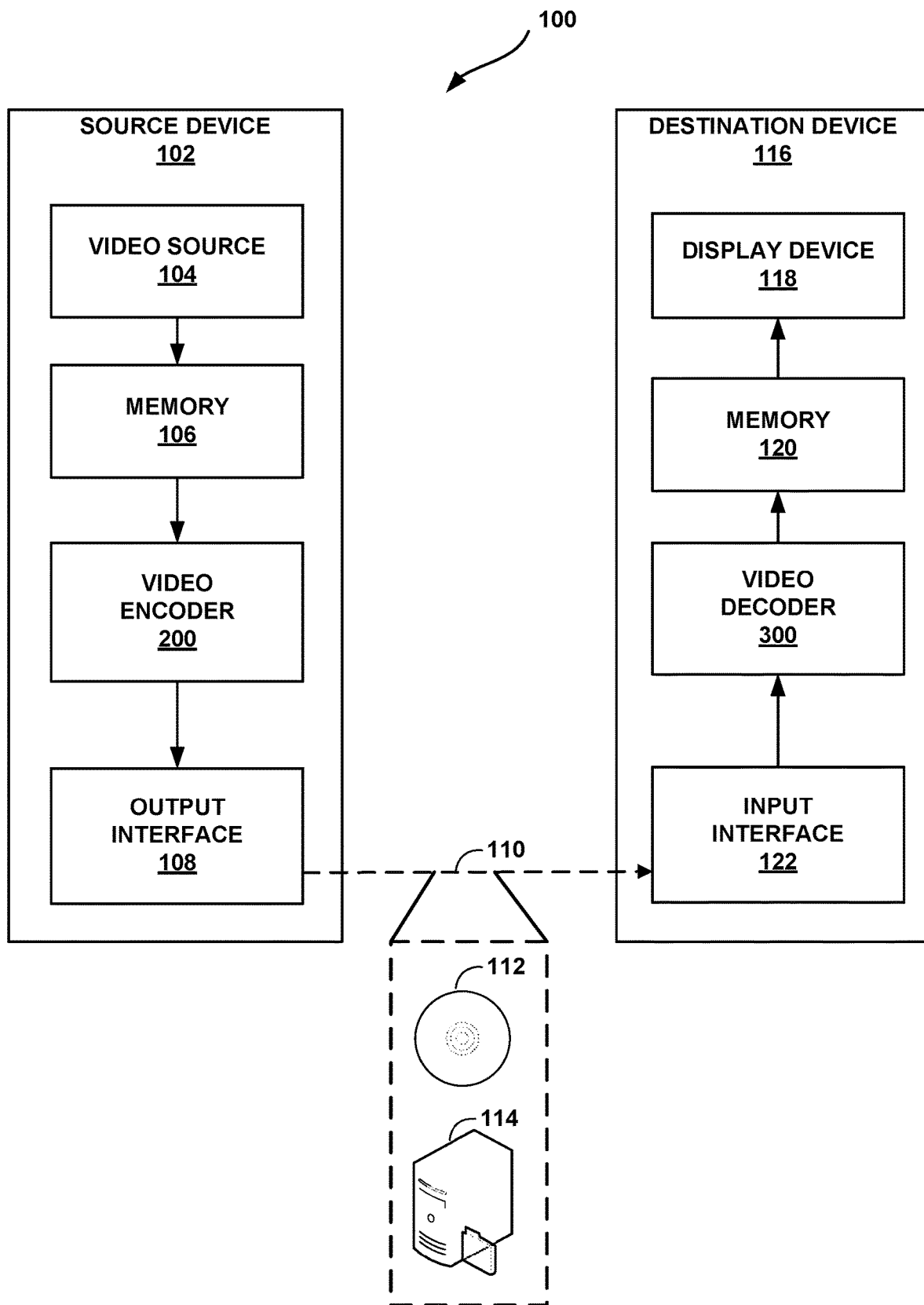
FIG. 1 is a block diagram illustrating an example video encoding and decoding system that may perform the techniques of this disclosure.

Video coding (e.g., video encoding and/or video decoding) typically involves predicting a block of video data from either an already coded block of video data in the same picture (e.g., intra prediction) or an already coded block of video data in a different picture (e.g., inter prediction). In some instances, the video encoder also calculates residual data by comparing the prediction block to the original block. Thus, the residual data represents a difference between the prediction block and the original block. To reduce the number of bits needed to signal the residual data, the video encoder transforms and quantizes the residual data and signals the transformed and quantized residual data in the encoded bitstream. The compression achieved by the transform and quantization processes may be lossy, meaning that transform and quantization processes may introduce distortion into the decoded video data.

A video decoder decodes and adds the residual data to the prediction block to produce a reconstructed video block that matches the original video block more closely than the prediction block alone. Due to the loss introduced by the transforming and quantizing of the residual data, the first reconstructed block may have distortion or artifacts. One common type of artifact or distortion is referred to as blockiness, where the boundaries of the blocks used to code the video data are visible.

To further improve the quality of decoded video, a video decoder can perform one or more filtering operations on the reconstructed video blocks. Examples of these filtering operations include deblocking filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder without needing the parameters to be explicitly signaled in the encoded video bitstream.

As will be explained in more detail below, some video coding standards support lossless coding modes. In a lossless coding mode, the decoded video data matches the encoded video data without error or distortion. One technique for achieving lossless video coding is to skip the quantization and inverse quantization processes described above. As will be explained in more detail below, video data is frequently coded in blocks of luma samples with two corresponding blocks of chroma samples. The video data may be coded in a joint chroma mode, also referred to as joint coding of chroma residuals (JCCR) mode, where a single chroma residual block is encoded for the two corresponding blocks of chroma samples. Existing video standards do not currently implement lossless coding modes that can also be used in conjunction with a joint chroma mode.

This disclosure describes techniques for implementing JCCR modes that also support lossless coding. Implementing lossless coding with JCCR modes, as described in this disclosure, may for some coding scenarios advantageously result in improved compression compared to other available lossless coding techniques.

In video coding, for YUV (e.g., Y, Cb, Cr) format, there may be two chroma components (e.g., Cb and Cr). For ease, examples are described herein with respect to Cb and Cr blocks, but the techniques are extendable to other types of chroma blocks and other video formats (e.g., RGB). For video encoding, a video encoder determines a residual block for the Cb block, referred to as resCb, and the Cr block, referred to as resCr. ResCb and resCr may represent a difference between respective chroma prediction blocks and original chroma blocks. That is, resCb represents a difference between the original Cb block and the Cb prediction block, and resCr represents a difference between the original Cr block and the Cr prediction block. In some techniques, the video encoder signals information for resCb and separately signals information for resCr, for example, after one or more of transformation to transform or frequency domain, quantization, and context-based or bypass-coding. A video decoder receives information for resCb' and resCr', separately, and adds resCb and resCr to respective ones of the Cb prediction block and Cr prediction block to reconstruct the Cb block and the Cr block. In lossy coding, for resCb' and resCr' may not exactly equal for resCb and resCr due to loss caused by the quantization and dequantization processes. In some implementations of lossless coding, resCb' and resCr' may equal resCb and resCr.

In a JCCR mode, rather than coding resCb and resCr separately, the video encoder constructs a joint residual block, referred to as resJointC based on resCb and resCr. The video encoder signals information for resJointC, which may reduce the amount of information that needs to be signaled as compared to separately signaling information for resCb and resCr. The video decoder receives information for resJointC, generates resJointC from the received information (referred to as resJointC' to indicate that resJointC is at the video decoder side), and then generates resCb' and resCr'.

In some cases, the use of JCCR may result in lossy coding. For instance, resCb' (e.g., residual Cb block at video decoder side) may not be identical to resCb (e.g., residual Cb block at video encoder side), and resCr' (e.g., residual Cr block at video decoder side) may not be identical to resCr (e.g., residual Cr block at video decoder side). Use of JCCR may result in lossy coding due to the transformation and quantization operations performed by the video encoder. However, in some cases, the operations used to generate the joint residual chroma block (e.g., resJointC) may itself by lossy. Techniques in which JCCR results in lossy coding may be referred to as a first type of JCCR.

For higher video quality, there may be instances where lossless video coding is preferred. Because in some examples JCCR is lossy, lossless video coding may not be available. Also, where lossless video coding may be utilized, the benefits from JCCR (e.g., reduction of amount of residual information that is signaled) may not be available.

This disclosure describes examples of techniques of a second type of JCCR. The second type of JCCR may be lossless or may be less lossy than the first type of JCCR. In some examples, the second type of JCCR may be utilized where transformation and/or quantization is bypassed or where transformation and/or quantization process is lossless. However, the examples of the second type of JCCR should not be construed to be limited to examples where there is no loss or limited to examples where transformation and/or quantization is bypassed or where transformation and/or quantization process is lossless.

According to the techniques of this disclosure, a video decoder may be configured to receive information for first residual samples for a first chroma component of a block of the video data and reconstruct the first chroma block based on the first residual samples and a first prediction block. The first residual samples may be determined in a manner such that adding the first residual samples to samples of the first prediction block results in the original first chroma block, and hence results in lossless coding of the first chroma block.

The video decoder may also determine intermediate reconstructed samples for a second chroma component of the block of video data based on the first residual samples and a second prediction block. The video decoder may receive information for second residual samples and reconstruct the second chroma block by adding the second residual samples to the intermediate reconstructed samples. The second residual samples may be determined in a manner such that adding the second residual samples to the intermediate reconstructed samples results in the original second chroma block, and hence results in lossless coding of the second chroma block. Moreover, as the intermediate reconstructed samples are typically very close to the samples of the original second chroma block, the second residual samples may typically be relatively small values, with lots of 0's and 1's for example, and thus can be efficiently coded with relatively few bits. Thus, by reconstructing the second chroma block based on the second residual samples and the intermediate reconstructed samples, a video encoding and decoding system may advantageously implement lossless coding while still benefiting from the bit savings that JCCR produces for some coding scenarios.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for joint coding of chroma residuals (JCCR). Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device. In this disclosure, operations described as being performed at the video encoder side may, for example, be performed by video encoder 200 of system 100, while operations described as being performed at the video decoder side may, for example, be performed by video decoder 300 of system 100.

System 100 as shown in FIG. 1 is merely one example. In general, any digital video encoding and/or decoding device may perform techniques for JCCR. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual (MPEG-4 Part 2), ITU-T H.264 (also known as ISO/IEC MPEG-4 AVC), including its Scalable Video Coding (SVC) and Multiview Video Coding (MVC) extensions and ITU-T H.265 (also known as ISO/IEC MPEG-4 HEVC) with its extensions.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 7)," Joint Video Experts Team (WET) of ITU-T SG 16 WP 3 and ISO/IEC JTC 1/SC 29/WG 11, 16$^{th}$ Meeting: Geneva, CH, 1-11 Oct. 2019, JVET-P2001-v14 (hereinafter "VVC Draft 7"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, video encoder 200 and video decoder 300 may be configured to perform techniques in accordance with joint coding of chroma residuals (JCCR). As described above and described in more detail below, in JCCR, the residual information for two chroma components may be combined to reduce the amount of information that is signaled. However, some techniques of JCCR may not be used for lossless coding. In some examples of this disclosure, video encoder 200 and video decoder 300 may utilize JCCR techniques but in such a way that the operations are lossless or at least less lossy than other techniques of JCCR.

In some examples of this disclosure, video decoder 300 may receive information for first residual samples for a first chroma component, wherein the first residual samples are based on a difference between a first chroma block of the first chroma component and a first prediction block of the first chroma component, determine intermediate samples based on the first residual samples, receive information for second residual samples for a second chroma component, wherein the second residual samples are based on a difference between a second chroma block of the second chroma component and the intermediate samples, wherein the second chroma block and the first chroma block are associated together (e.g., part of the same CU), reconstruct the first chroma block based on the first residual samples and the first prediction block, and reconstruct the second chroma block based on the second residual samples and the intermediate samples.

In some examples, video decoder 300 may receive information for a set of values, wherein the set values are generated based on first set of residual samples for a first chroma block of a first chroma component and second set of residual samples for a second chroma block of a second chroma component, wherein the first chroma block and the second chroma block are associated, determine first intermediate samples based on the set of values, determine second intermediate samples based on the set of values, receive information for first residual samples, wherein the first residual samples are based on a difference between a first chroma block of the first chroma component and the first intermediate samples, receive information for second residual samples, wherein the second residual samples are based on a difference between a second chroma block of the second chroma component and the second intermediate samples, reconstruct the first chroma block based on the first residual samples and the first intermediate samples, and reconstruct the second chroma block based on the second residual samples and the second intermediate samples.

In some examples, video encoder 200 may signal information for first residual samples for a first chroma component, wherein the first residual samples are based on a difference between a first chroma block of the first chroma component and a first prediction block of the first chroma component, determine intermediate samples based on the first residual samples, and signal information for second residual samples for a second chroma component, wherein the second residual samples are based on a difference between a second chroma block of the second chroma component and the intermediate samples, and wherein the second chroma block and the first chroma block are associated together (e.g., part of the same CU).

In some examples, video encoder 200 may generate a set of values based on a first set of residual samples for a first chroma component and a second set of residual samples for a second chroma component, wherein the first set of residual samples are based on a difference between a first chroma block of the first chroma component and a first prediction block and the second set of residual samples are based on a difference between a second chroma block for the second chroma component and a second prediction block, wherein the first chroma block and the second chroma block are associated, signal information for the set of values, determine first intermediate samples based on the set of values, determine second intermediate samples based on the set of values, signal information for first residual samples, wherein the first residual samples are based on a difference between the first chroma block of the first chroma component and the first intermediate samples, and signal information for second residual samples, wherein the second residual samples are based on a difference between the second chroma block of the second chroma component and the second intermediate samples.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
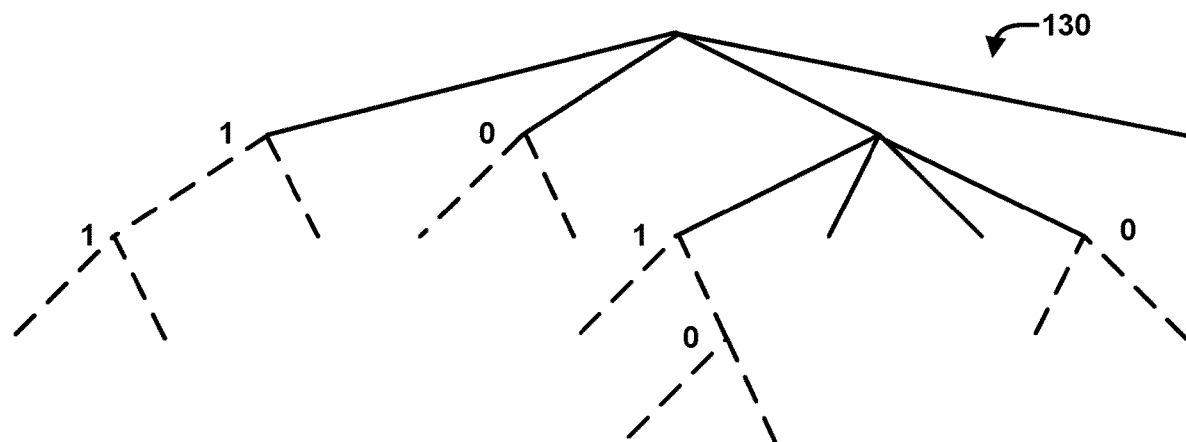
FIGS. 2A and 2B are conceptual diagrams illustrating an example quadtree binary tree (QTBT) structure, and a corresponding coding tree unit (CTU).
Figure 2B:
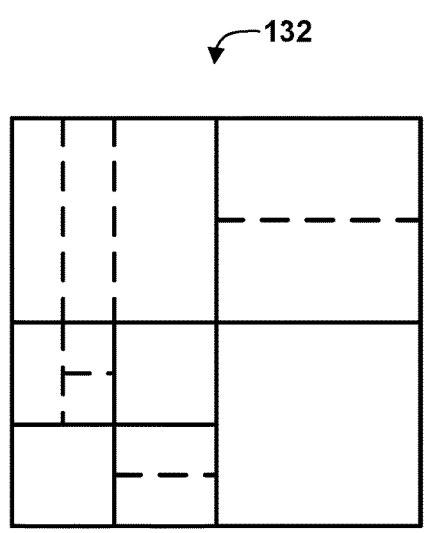

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction)

and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, the leaf quadtree node will not be further split by the binary tree, because the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. The binary tree node having a width equal to MinBTSize (4, in this example) implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

"Versatile Video Coding (Draft 6)," Joint Video Experts Team (WET) of ITU-T SG 16 WP 3 and ISO/IEC JTC 1/SC 29/WG 11, 15$^{th}$ Meeting: Gothenburg, SE, 3-12 Jul. 2019, WET-02001-vD (hereinafter "VVC Draft 6") supports a mode where the chroma residuals are coded jointly. The usage (activation) of a joint chroma coding mode is indicated by a TU-level flag tu_joint_cbcr_residual_flag and the selected mode is implicitly indicated by the chroma CBFs.

The flag tu_joint_cbcr_residual_flag is present if either or both chroma CBFs for a TU are equal to 1. In the picture parameter set (PPS) and slice header, chroma QP offset values are signalled for the joint chroma residual coding mode to differentiate from the usual chroma QP offset values signalled for regular chroma residual coding mode. These chroma QP offset values are used to derive the chroma QP values for those blocks coded using the joint chroma residual coding mode. When a corresponding joint chroma coding mode (modes 2 in Table 1 below) is active in a TU, this chroma QP offset is added to the applied luma-derived chroma QP during quantization and decoding of that TU. For the other modes (modes 1 and 3 in Table 1 below), the chroma QPs are derived in the same way as for conventional Cb or Cr blocks. The reconstruction process of the chroma residuals (resCb and resCr) from the transmitted transform blocks is depicted in Table 1. When this mode is activated, one single joint chroma residual block (resJointC'[x][y] in Table 1) is signalled, and a residual block for Cb (resCb) and a residual block for Cr (resCr) are derived considering information such as tu_cbf_cb, tu_cbf_cr, and CSign, which is a sign value specified in the picture header as described in Helmrich et al. "CE7: Joint chroma residual coding with multiple modes (tests CE7-2.1, CE7-2.2)," Joint Video Experts Team (JVET) of ITU-T SG 16 WP 3 and ISO/IEC JTC 1/SC 29/WG 11, 15$^{th}$ Meeting: Gothenburg, SE, 3-12 Jul. 2019, JVET-00105 and Helmrich et al. "Alternative configuration for joint chroma residual coding" Joint Video Experts Team (JVET) of ITU-T SG 16 WP 3 and ISO/IEC JTC 1/SC 29/WG 11, 15$^{th}$ Meeting: Gothenburg, SE, 3-12 Jul. 2019, JVET-00543.

At the encoder side, the joint chroma components are derived as explained in the following. Depending on the mode, resJointC is generated by video encoder 200 as shown in Table 1. The reconstructions for the chroma residuals for different modes performed by video decoder 300 are shown in Table 2.

For all modes, the original residual at the encoder side is calculated as: resCb[x][y]=origCb[x][y]−predCb[x][y], and resCr[x][y]=origCr[x][y]−predCr[x][y]. The residuals derived at the decoder side res'Cb[x][y] and res'Cr[x][y], in general, are not the same as resCb[x][y] and resCr[x][y], due to transform and quantization, and due to joint representation.

Also, at the decoder side, the joint residual resJointC' is not necessarily the same, unless it is transform and quantization bypassed, as the generated joint residual resJointC by video encoder 200 due to transform/quantization. Even if resJointC is sent lossless (e.g., transquant-bypass or transform skip with QP=4 for bitdepth 8), there may not be a guarantee of lossless reconstruction of the chroma residuals due to joint representation of residuals.

TABLE 1

Generation of joint chroma residual

| tu_cbf_cb | tu_cbf_cr | Generation of joint residual | mode |
|---|---|---|---|
| 1 | 0 | resJointC[ x ][ y ] = ( 4 * resCb[ x ][ y ] + 2 * CSign * resCr[ x ][ y ] ) / 5. | 1 |
| 1 | 1 | resJointC[ x ][ y ] = ( resCb[ x ][ y ] + CSign * resCr[ x ][ y ] ) / 2. | 2 |
| 0 | 1 | resJointC[ x ][ y ] = ( 4 * resCr[ x ][ y ] + 2 * CSign * resCb[ x ][ y ] ) / 5. | 3 |

TABLE 2

Reconstruction of chroma residuals.

| tu_cbf_cb | tu_cbf_cr | reconstruction of Cb and Cr residuals | mode |
|---|---|---|---|
| 1 | 0 | res'Cb[ x ][ y ] = resJointC'[ x ][ y ]<br>res'Cr[ x ][ y ] = ( CSign * resJointC'[ x ][ y ] ) >> 1 | 1 |
| 1 | 1 | res'Cb[ x ][ y ] = resJointC'[ x ][ y ]<br>res'Cr[ x ][ y ] = CSign * resJointC'[ x ][ y ] | 2 |
| 0 | 1 | res'Cb[ x ][ y ] = ( CSign * resJointC'[ x ][ y ] ) >> 1<br>res'Cr[ x ][ y ] = resJointC'[ x ][ y ] | 3 |

The reconstruction at the decoder side (e.g., by video decoder 300), for all modes, is as follows: recCb[x][y]=predCb[x][y]+res'Cb[x][y] and recCr[x][y]=predCr[x][y]+res'Cr[x][y]. The three joint chroma coding modes described above may be supported in intra predicted CUs. For non-intra CUs, only mode 2 may be supported. Hence, in non-intra CUs, the syntax element tu_joint_cbcr_residual_flag may only be present if both chroma cbfs are 1.

In Xu et al., "CE8-related: A SPS Level Flag for BDPCM and JCCR," Joint Video Experts Team (JVET) of ITU-T SG 16 WP 3 and ISO/IEC JTC 1/SC 29/WG 11, 15th Meeting: Gothenburg, SE, 3-12 Jul. 2019, JVET-O0376, a sequence parameter set (SPS) level flag has been added to control enabling/disabling of joint-Cb-Cr for each video sequence. Accordingly, by setting this SPS flag to zero, an explicit way of disabling JCCR can be carried out in VVC.

The following describes lossless coding functionality with VVC codec. VVC is also planned to support lossless coding, and currently lossless coding is being investigated in an Ad-hoc group (AHG) and in core experiments. During JVET 16$^{th}$ meeting cycle, AHG18 produced a lossless VTM anchor which is based on the HEVC transform quantization bypass and extended to new VVC tools with some normative and non-normative changes. Subsequently, in Bross et al. "AHG 18: Enabling lossless coding with minimal impact on VVC design," Joint Video Experts Team (WET) of ITU-T SG 16 WP 3 and ISO/IEC JTC 1/SC 29/WG 11, 16$^{th}$ Meeting: Geneva, CH, 1-11 Oct. 2019, JVET-P0606, an improved design for enabling lossless coding with minimal impact on VVC design was proposed.

However, there may be issues with using JCCR with lossless coding (or at least less lossy coding than where JCCR was previously used). For current JVET activity of enabling lossless functionality, the JCCR tool is disabled from SPS level. This is due to the reason that, JCCR only signals one residual for both Cb and Cr components, and in general, with this approach it may not be possible to have lossless coding of the residual, and hence, lossless coding may not be available.

This disclosure describes several techniques for achieving lossless coding using existing JCCR mode with minimal modification. The example techniques may be used together or separately. For ease, this disclosure describes examples with respect to technique one and technique two. However, the techniques should not be construed as being limited to two techniques.

For the current JCCR method, the generation of the joint chroma residual at the encoder side is performed by a linear combination of Cb and Cr residuals. In general, the joint residual computed in this way is not a lossless version of either Cb and Cr residuals.

In technique one, two residuals are signaled, resJointC and resJointC2, to achieve lossless coding (for original JCCR only resJointC is signaled). The encoder side (e.g., operations of video encoder 200) and decoder side (e.g., operations of video decoder 300) processes are shown in Table 3. For convenience, the components Cb and Cr are defined as first and second components. For mode 1 and mode 2, Cb and Cr are the first and second components, respectively, and for mode 3, Cr and Cb are the first and second components, respectively. As shown in table 3, resJointC is calculated by video encoder 200 in such a way that the lossless reconstruction of the first component is available, and in some cases, guaranteed. That is, video encoder 200 and video decoder 300 use a lossless version of either resCb or resCr (depending on the mode) as resJointC. The clipping bounds are (0, $2^{bitdePth}-1$), where bitdepth is the internal (processing) codec operated bit depth.

In the second step, an intermediate step of reconstruction of the second component (rec1Cr/rec1Cb) is performed as per the decoding process of the original JCCR method with clipping. Subsequently, resJointC2 is calculated by subtracting this intermediate reconstruction from the original second component. Here, the clipping stage may ensure that the intermediate reconstruction values are inside the dynamic range, and subsequently, clipping may also ensure that resJointC2 will have the same dynamic range as other residuals (for example, resJointC etc.).

In order to be lossless coding, resJointC and resJointC2 should be coded in a lossless way. That can either be achieved using bypassing transform and quantization stage (same as HEVC lossless mode), or with Transform Skip with QP=4+2*(8−bitdepth), which makes the quantization step-size=1, and due to no transform, lossless coding is achievable. In some examples, QP offsets of the JCCR mode also need to be zero.

TABLE 3

Encoding and decoding process for technique one.

| tu_cbf_cb | tu_cbf_cr | Generation of joint residual | mode |
|---|---|---|---|
| 1 | 0 | resJointC[x][y] = resCb[x][y] = origCb[x][y] − predCb[x][y]<br>rec1Cr[x][y] = Clip(predCr[x][y] + CSign*resJointC[x][y] >>1)<br>resJointC2[x][y] = OrigCr[x][y] − rec1Cr[x][y] | 1 |
| 1 | 1 | resJointC[x][y] = resCb[x][y] = origCb[x][y] − predCb[x][y]<br>rec1Cr[x][y] = Clip(predCr[x][y] + CSign*resJointC[x][y])<br>resJointC2[x][y] = OrigCr[x][y] − rec1Cr[x][y] | 2 |
| 0 | 1 | resJointC[x][y] = resCr[x][y] = origCr[x][y] − predCr[x][y]<br>rec1Cb[x][y] = Clip(predCb[x][y] + CSign*resJointC[x][y] >>1)<br>resJointC2[x][y] = OrigCb[x][y] − rec1Cb[x][y] | 3 |

| tu_cbf_cb | tu_cbf_cr | reconstruction of Cb and Cr components | mode |
|---|---|---|---|
| 1 | 0 | resCb[x][y] = resJointC[x][y], recCb[x][y] = predCb[x][y] + resCb[x][y]<br>rec1Cr[x][y] = Clip(predCr[x][y] + CSign*resJointC[x][y] >>1)<br>recCr[x][y] = rec1Cr[x][y] + resJointC2[x][y] | 1 |
| 1 | 1 | resCb[x][y] = resJointC[x][y], recCb[x][y] = predCb[x][y] + resCb[x][y]<br>rec1Cr[x][y] = Clip(predCr[x][y] + CSign*resJointC[x][y])<br>recCr[x][y] = rec1Cr[x][y] + resJointC2[x][y] | 2 |
| 0 | 1 | resCr[x][y] = resJointC[x][y], recCr[x][y] = predCr[x][y] + resCr[x][y]<br>rec1Cb[x][y] = Clip(predCb[x][y] + CSign*resJointC[x][y] >>1)<br>recCb[x][y] = rec1Cb[x][y] + resJointC2[x][y] | 3 |

The following is an example with 2×2 residuals with 10 bit internal bitdepth. In this example, CSign=+1 and mode 1 is used.

The original Cb chroma block (origCb) is $$\begin{bmatrix} 1020 & 1018 \\ 1016 & 1014 \end{bmatrix}$$

and the Cb prediction block (predCb) is $$\begin{bmatrix} 900 & 898 \\ 896 & 894 \end{bmatrix}.$$

Therefore, viaeo encoder 200 may determine the Cb residual block (resCb) as $$\begin{bmatrix} 120 & 120 \\ 120 & 120 \end{bmatrix}.$$

The original Ur chroma block (origCr) is $$\begin{bmatrix} 1022 & 1020 \\ 1018 & 1016 \end{bmatrix}$$

and the Cr prediction block (predCb) is $$\begin{bmatrix} 972 & 970 \\ 968 & 966 \end{bmatrix}.$$

Therefore, video encoder 200 may determine the Cr residual block (resCr) as $$\begin{bmatrix} 50 & 50 \\ 50 & 50 \end{bmatrix}.$$

Video encoder 200 may determine resJointC, which is to be signaled, as resCb=origCb−predCb, which equals $$\begin{bmatrix} 120 & 120 \\ 120 & 120 \end{bmatrix}.$$

Video decoder 300 may reconstruct the Cb chroma block (recCb) as resJointC+predCb, which is $$= \begin{bmatrix} 900 & 898 \\ 896 & 894 \end{bmatrix} + \begin{bmatrix} 120 & 120 \\ 120 & 120 \end{bmatrix} = \begin{bmatrix} 1020 & 1018 \\ 1016 & 1014 \end{bmatrix} (= OrigCb).$$

Video encoder 200 and video decoder 300 may both determine rec1Cr as $$\text{Clip}(Csign^*(resJointC \gg 1) + predCr) =$$

$$\text{Clip}\left(1^* \begin{bmatrix} 60 & 60 \\ 60 & 60 \end{bmatrix} + \begin{bmatrix} 972 & 970 \\ 968 & 966 \end{bmatrix}\right) = \text{Clip}\left(\begin{bmatrix} 1032 & 1030 \\ 1028 & 1026 \end{bmatrix}\right),$$

which results in $$\begin{bmatrix} 1023 & 1023 \\ 1023 & 1023 \end{bmatrix}.$$

Video encoder 200 may determine resJointC2, which is to be signaled, as resJoint $$C2 = origCr - rec1Cr = \begin{bmatrix} -1 & -3 \\ -5 & -7 \end{bmatrix}.$$

Video decoder 300 may reconstruct the Cr chroma block (recCr) as resJointC2+rec1Cr, which equals origCr.

Although the method 1 builds on the original JCCR method with scaling factor of ½ for the second component with respect to the first one, such restrictions may be removed for a more generalized approach with a scaling factor of k1 or k2 (in the range of (0,1) excluding the value of 0 and 1), as shown in Table 3.1. The values k1 and k2 can be signaled in SPS or picture header or CTU level, or in TU level. The value of b is a positive integer, which may be predetermined, fixed or signaled in SPS, picture header, or CTU level.

TABLE 3.1

| | | generalized version of technique one. | |
|---|---|---|---|
| tu_cbf_cb | tu_cbf_cr | Generation of joint residual | mode |
| 1 | 0 | resJointC[x][y] = resCb[x][y] = origCb[x][y] − predCb[x][y]<br>rec1Cr[x][y] = Clip(predCr[x][y] + CSign*k1*resJointC[x][y] >> b)<br>resJointC2[x][y] = OrigCr[x][y] − rec1Cr[x][y] | 1 |
| 1 | 1 | resJointC[x][y] = resCb[x][y] = origCb[x][y] − predCb[x][y]<br>rec1Cr[x][y] = Clip(predCr[x][y] + CSign*resJointC[x][y] >> b)<br>resJointC2[x][y] = OrigCr[x][y] − rec1Cr[x][y] | 2 |
| 0 | 1 | resJointC[x][y] = resCr[x][y] = origCr[x][y] − predCr[x][y]<br>rec1Cb[x][y] = Clip(predCb[x][y] + CSign*k2*resJointC[x][y])<br>resJointC2[x][y] = OrigCb[x][y] − rec1Cb[x][y] | 3 |
| tu_cbf_cb | tu_cbf_cr | reconstruction of Cb and Cr components | mode |
| 1 | 0 | resCb[x][y] = resJointC[x][y], recCb[x][y] = predCb[x][y] + resCb[x][y]<br>rec1Cr[x][y] = Clip(predCr[x][y] + CSign*k1*resJointC[x][y] >> b)<br>recCr[x][y] = rec1Cr[x][y] + resJointC2[x][y] | 1 |

TABLE 3.1-continued generalized version of technique one.

| | | | |
|---|---|---|---|
| 1 | 1 | resCb[x][y] = resJointC[x][y], recCb[x][y] = predCb[x][y] + resCb[x][y]<br>rec1Cr[x][y] = Clip(predCr[x][y] + CSign*resJointC[x][y])<br>recCr[x][y] = rec1Cr[x][y] + resJointC2[x][y] | 2 |
| 0 | 1 | resCr[x][y] = resJointC[x][y], recCr[x][y] = predCr[x][y] + resCr[x][y]<br>rec1Cb[x][y] = Clip(predCb[x][y] + CSign*k2*resJointC[x][y] >> b)<br>recCb[x][y] = rec1Cb[x][y] + resJointC2[x][y] | 3 |

To implement the techniques of Tables 3 and 3.1 above, video encoder 200 may, for example, be configured to determine first residual samples (e.g., recCb[x][y]= resJointC[x][y]) for a first chroma component of a block of the video data, with the first residual samples corresponding to a difference between a first chroma block (e.g., recCb[x][y]) of the first chroma component and a first prediction block (e.g., predCb[x][y]) of the first chroma component. Video encoder 200 determines intermediate reconstructed samples (e.g., rec1Cr[x][y]) based on the first residual samples (e.g., resJointC[x][y]) and a second prediction block (e.g., predCr[x][y]) of the second chroma component and determines second residual samples (e.g., resJointC2[x][y]) for the second chroma component of the block of video data, with the second residual samples corresponding to a difference between a second chroma block (e.g., recCr[x][y]) of the second chroma component and the intermediate reconstructed samples (e.g., rec1Cr[x][y]). Video encoder 200 may output, in a bitstream of encoded video data, syntax elements representing the first residual samples and the second residual samples.

To implement the techniques of Tables 3 and 3.1 above, video decoder 300 may, for example, be configured to receive information for first residual samples (e.g., resCb[x][y]=resJointC[x][y]) for a first chroma component of a block of the video data, with the first residual samples corresponding to a difference between a first chroma block (e.g., recCb[x][y]) of the first chroma component and a first prediction block (e.g., predCb[x][y]) of the first chroma component. Video decoder 300 may determine intermediate reconstructed samples (e.g., rec1Cr[x][y]) based on the first residual samples (e.g., resJointC[x][y]) and receive information for second residual samples (e.g., resJointC2[x][y]) for a second chroma component of the block of video data, with the second residual samples corresponding to a difference between a second chroma block (e.g., recCr[x][y]) of the second chroma component and the intermediate reconstructed samples (e.g., rec1Cr[x][y]). Video decoder 300 may reconstruct the first chroma block based on the first residual samples and the first prediction block (e.g., recCb[x][y]=predCb[x][y]+resCb[x][y]) and reconstruct the second chroma block based on the second residual samples and the intermediate reconstructed samples (e.g., recCr[x][y]= rec1Cr[x][y]+resJointC2[x][y]). It should be understood that the examples above are described with respect to modes 1 and 2, where the first chroma component is a Cb component and the second chroma component is a Cr component. For mode 3, the first chroma component may be a C3 component and the second chroma component may be a Cb component.

In example technique one, two residuals are signaled resJointC and resJointC2. In example technique two, three residuals may be signaled. For example, in example technique two, three residuals are signaled, resJointC', resJointC) and resJointC2, to achieve lossless coding (as described above, for original JCCR only resJointC' is signaled, and for technique one resJointC and resJointC2 are signaled).

The encoder side (e.g., performed by video encoder 200) and decoder side (e.g., performed by video decoder 300) processes are shown in Table 4 and Table 5, respectively. For all the modes, the original residual at the encoder side is calculated as: resCb[x][y]=origCb[x][y]−predCb[x][y], and resCr[x][y]=origCr[x][y]−predCr[x][y]. In some examples, resJointC (e.g., the uncompressed residual) is calculated in the same way as the original JCCR process as shown previously in Table 1. However, using only joint residual resJointC' (which for lossless coding equals to resJointC) for reconstructing the Cb and Cr component may not provide lossless representation. Accordingly, the additional secondary residuals for Cb and Cr, for lossless coding are derived, which are resJointC1 and resJointC2 respectively, as shown in Table 4. In some examples, resJointC' does not necessarily have to be the same as resJointC, so even a lossy coding of resJointC can be performed (transform and/or quantization).

Compared to technique one, technique two uses one extra residual (in total three), but the benefit is that, resJointC' can be a lossy version of resJointC (e.g., transform and/or quantization can be performed), which can be better in terms of compression.

TABLE 4

Generation of joint chroma residual for technique two

| tu_cbf_cb | tu_cbf_cr | Generation of joint residual | mode |
|---|---|---|---|
| 1 | 0 | resJointC[ x ][ y ] = ( 4 * resCb[ x ][ y ] + 2 * CSign * resCr[ x ][ y ] ) / 5.<br>rec1Cb[x][y] = Clip(predCb[x][y] + resJointC'[x][y] )<br>rec1Cr[x][y] = Clip(predCr[x][y] + CSign*resJointC'[x][y] >>1) | 1 |
| 1 | 1 | resJointC[ x ][ y ] = ( resCb[ x ][ y ] + CSign * resCr[ x ][ y ]) / 2.<br>rec1Cb[x][y] = Clip(predCb[x][y] + resJointC'[x][y] )<br>rec1Cr[x][y] = Clip(predCr[x][y] + CSign*resJointC'[x][y]) | 2 |
| 0 | 1 | resJointC[ x ][ y ] = ( 4 * resCr[ x ][ y ] + 2 * CSign * resCb[ x ][ y ] ) / 5.<br>rec1Cb[x][y] = Clip(predCb[x][y] + CSign*resJointC'[x][y]>>1 )<br>rec1Cr[x][y] = Clip(predCr[x][y] + resJointC'[x][y]) | 3 |

For all the modes
resJoint1[x][y] = origCb[x][y] − rec1Cb[x][y]
resJoint2[x][y] = origCr[x][y] − rec1Cr[x][y]

TABLE 5

Reconstruction of chroma components for technique two.

| tu_cbf_cb | tu_cbf_cr | reconstruction of Cb and Cr residuals | mode |
|---|---|---|---|
| 1 | 0 | rec1Cb[x][y] = Clip(predCb[x][y] + resJointC'[x][y]) <br> rec1Cr[x][y] = Clip(predCr[x][y] + CSign*resJointC'[x][y] >>1) | 1 |
| 1 | 1 | rec1Cb[x][y] = Clip(predCb[x][y] + resJointC'[x][y] ) <br> rec1Cr[x][y] = Clip(predCr[x][y] + CSign*resJointC'[x][y]) | 2 |
| 0 | 1 | rec1Cb[x][y] = Clip(predCb[x][y] + CSign*resJointC'[x][y]>>1 ) <br> rec1Cr[x][y] = Clip(predCr[x][y] + resJointC'[x][y]) | 3 |

For all the modes
recCb[x][y] = resJoint1[x][y] + rec1Cb[x][y]
recCr[x][y] = resJoint2[x][y] + rec1Cr[x][y]

Similar to technique one, technique two can be also extended for a more generalized approach with a scaling factor of k1 or k2 (in the range of (0,1) excluding the value of 0 and 1) as shown in Table 6 and Table 7. The values k1 and k2 can be signaled in SPS or picture header, CTU level, or in TU level.

TABLE 6 generalized version of technique 2 (encoder)

| tu_cbf_cb | tu_cbf_cr | Generation of joint residual | mode |
|---|---|---|---|
| 1 | 0 | resJointC[ x ][ y ] = ( 4 * resCb[ x ][ y ] + 4 * k1 * CSign * resCr[ x ][ y ] ) / 5. <br> rec1Cb[x][y] = Clip(predCb[x][y] + resJointC'[x][y] ) <br> rec1Cr[x][y] = Clip(predCr[x][y] + CSign*k1*resJointC'[x][y]) | 1 |
| 1 | 1 | resJointC[ x ][ y ] = ( resCb[ x ][ y ] + CSign * resCr[ x ][ y ] ) / 2. <br> rec1Cb[x][y] = Clip(predCb[x][y] + resJointC'[x][y] ) <br> rec1Cr[x][y] = Clip(predCr[x][y] + CSign*resJointC'[x][y]) | 2 |
| 0 | 1 | resJointC[ x ][ y ] = ( 4 * resCr[ x ][ y ] + 4 * k2 * CSign * resCb[ x ][ y ] ) / 5. <br> rec1Cb[x][y] = Clip(predCb[x][y] + CSign*k2*resJointC'[x][y]) <br> rec1Cr[x][y] = Clip(predCr[x][y] + resJointC'[x][y]) | 3 |

For all the modes
resJoint1[x][y] = origCb[x][y] − rec1Cb[x][y]
resJoint2[x][y] = origCr[x][y] − rec1Cr[x][y]

TABLE 7 generalized version of method 2 (decoder)

| tu_cbf_cb | tu_cbf_cr | reconstruction of Cb and Cr residuals | mode |
|---|---|---|---|
| 1 | 0 | rec1Cb[x][y] = Clip(predCb[x][y] + resJointC'[x][y] ) <br> rec1Cr[x][y] = Clip(predCr[x][y] + CSign*k1*resJointC'[x][y]) | 1 |
| 1 | 1 | rec1Cb[x][y] = Clip(predCb[x][y] + resJointC'[x][y] ) <br> rec1Cr[x][y] = Clip(predCr[x][y] + CSign*resJointC'[x][y]) | 2 |
| 0 | 1 | rec1Cb[x][y] = Clip(predCb[x][y] + CSign*k2*resJointC'[x][y]) <br> rec1Cr[x][y] = Clip(predCr[x][y] + resJointC'[x][y]) | 3 |

For all the modes
recCb[x][y] = resJoint1[x][y] + rec1Cb[x][y]
recCr[x][y] = resJoint2[x][y] + rec1Cr[x][y]

The following describes transform unit—(TU) level and HLS (high level syntax) level control. Either technique one or technique two can be used for lossy coding or lossless coding. Accordingly, a TU level flag may indicate whether JCCR uses 1 residual (original JCCR) or more than 1 residual (modified JCCR, which may be technique one or technique two). In some examples, additional signaling may be used to specify between technique one and technique two. An SPS/picture header level control can also be provided to disable the option of using modified JCCR, so that the TU level flag for modified JCCR can be avoided. In some examples, modified JCCR can be used to replace original JCCR.

Figure 3:
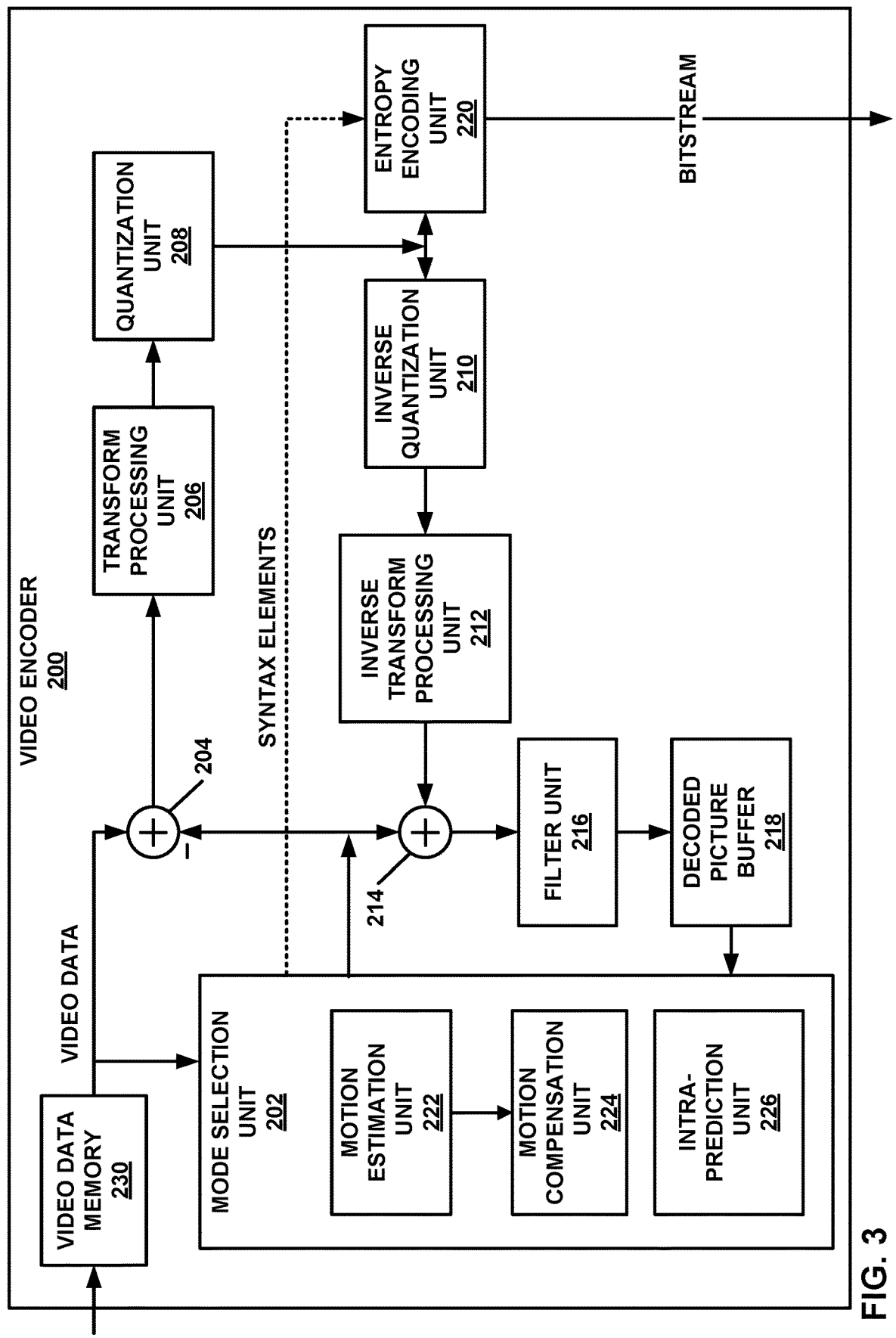
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 (VVC) video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to signal information for first residual samples for a first chroma component, wherein the first residual samples are based on a difference between a first chroma block of the first chroma component and a first prediction block of the first chroma component, determine intermediate samples based on the first residual samples, and signal information for second residual samples for a second chroma component, wherein the second residual samples are based on a difference between a second chroma block of the second chroma component and the intermediate samples, wherein the second chroma block and the first chroma block are associated together.

The one or more processing units of video encoder 200 may also be configured to generate a set of values (e.g., resJointC) based on a first set of residual samples (e.g., resCb) for a first chroma component and a second set of residual samples (e.g., resCr) for a second chroma component, wherein the first set of residual samples are based on a difference between a first chroma block of the first chroma component and a first prediction block and the second set of residual samples are based on a difference between a second chroma block for the second chroma component and a second prediction block, wherein the first chroma block and the second chroma block are associated (e.g., part of the same CU), signal information for the set of values, signal information for the set of values, determine first intermediate samples (e.g., rec1Cb) based on the set of values, determine second intermediate samples (e.g., rec1Cr) based on the set of values, signal information for first residual samples (e.g., resJoint1), wherein the first residual samples are based on a difference between the first chroma block of the first chroma component and the first intermediate samples, and signal information for second residual samples (e.g., resJoint2), wherein the second residual samples are based on a difference between the second chroma block of the second chroma component and the second intermediate samples.

Figure 4:
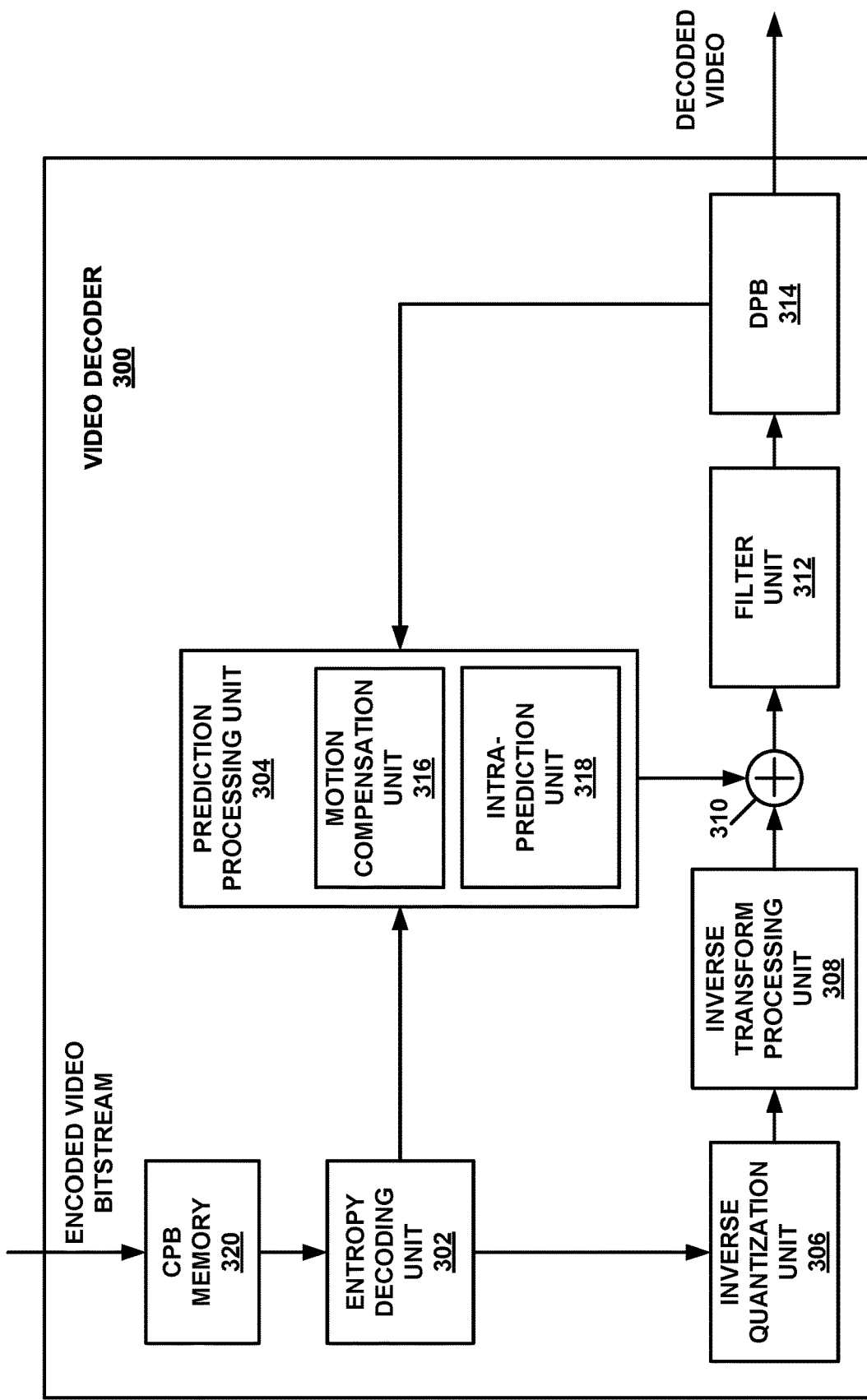
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of JEM, VVC, and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, of FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to receive information for first residual samples for a first chroma component, wherein the first residual samples are based on a difference between a first chroma block of the first chroma component and a first prediction block of the first chroma component, determine intermediate samples based on the first residual samples, receive information for second residual samples for a second chroma component, wherein the second residual samples are based on a difference between a second chroma block of the second chroma component and the intermediate samples, and wherein the second chroma block and the first chroma block are associated together, reconstruct the first chroma block based on the first residual samples and the first prediction block, and reconstruct the second chroma block based on the second residual samples and the intermediate samples.

The processing units of video decoder 300 may also be configured to receive information for a set of values, wherein the set values are generated based on first set of residual samples (e.g., resCb) for a first chroma block of a first chroma component and second set of residual samples (e.g., resCr) for a second chroma block of a second chroma component, wherein the first chroma block and the second chroma block are associated (e.g., part of the same CU), determine first intermediate samples based on the set of values (e.g., rec1Cb), determine second intermediate samples based on the set of values (e.g., rec1Cr), receive information for first residual samples (e.g., resJoint1), wherein the first residual samples are based on a difference between a first chroma block of the first chroma component and the first intermediate samples, receive information for second residual samples (e.g., resJoint2), wherein the second residual samples are based on a difference between a second chroma block of the second chroma component and the second intermediate samples, reconstruct the first chroma block based on the first residual samples and the first intermediate samples, and reconstruct the second chroma block based on the second residual samples and the second intermediate samples.

Figure 5:
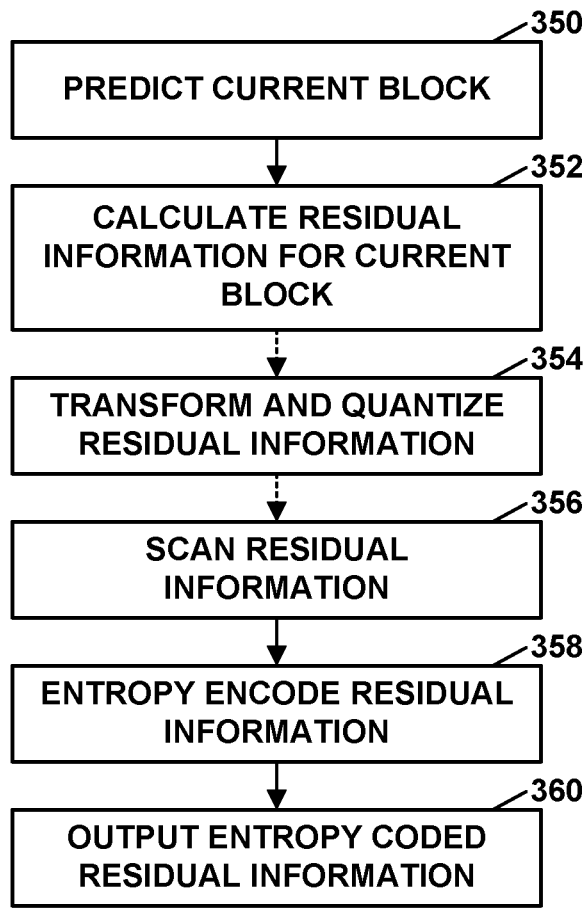
FIG. 5 is a flowchart illustrating an example of encoding video data.

FIG. 5 is a flowchart illustrating an example method for encoding a current block. The current block may comprise a current CU. Although described with respect to video encoder 200 (FIGS. 1 and 3), it should be understood that other devices may be configured to perform a method similar to that of FIG. 5.

In this example, video encoder 200 initially predicts the current block (350). For example, video encoder 200 may form a prediction block for the current block. Video encoder 200 may then calculate residual information for the current block (352). To calculate the residual information, video encoder 200 may calculate resJointC and resJointC2 as described above (e.g., based on determining rec1Cr or rec1Cb) for technique one, or video encoder 200 may calculate resJointC, resJointC1, and resJointC2 as described above (e.g., based on determining rec1Cr and rec1Cb) for technique two.

Optionally (e.g., when lossless coding is not needed), Video encoder 200 may then transform and quantize the residual information (354). Video encoder 200 may scan the residual information (if arranged in block form) (356). During the scan, or following the scan, video encoder 200 may entropy encode the residual information (358). For example, video encoder 200 may encode the residual information using CAVLC or CABAC. Video encoder 200 may then output (e.g., signal) the entropy encoded residual information (360).

Figure 6:
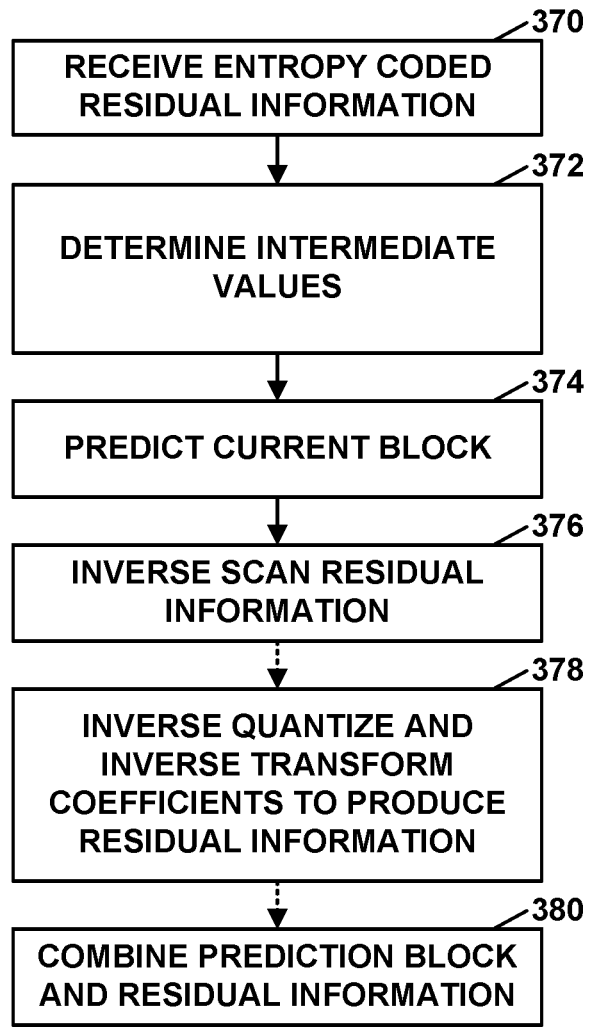
FIG. 6 is a flowchart illustrating an example of decoding video data.

FIG. 6 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 6.

Video decoder 300 may receive entropy encoded residual information such as resJointC and resJointC2 for technique one or resJointC, resJointC1, and resJointC2 for technique two (370). Video decoder 300 may determine intermediate values (e.g., rec1Cb and rec1Cr for techniques one and two as described above) (372). Video decoder 300 may predict the current block (374), e.g., using an intra- or inter- prediction mode as indicated by the prediction information for the current block, to calculate a prediction block for the current block. Video decoder 300 may then inverse scan the residual information (if the residual information is in block form) (376), to create a block of residual information. Where lossless coding was not needed, and therefore shown in dashed lines, video decoder 300 may then inverse quantize and inverse transform the transform coefficients to produce the residual information (378). Video decoder 300 may ultimately decode the current block by combining the prediction block and the residual information (380).

Figure 7:
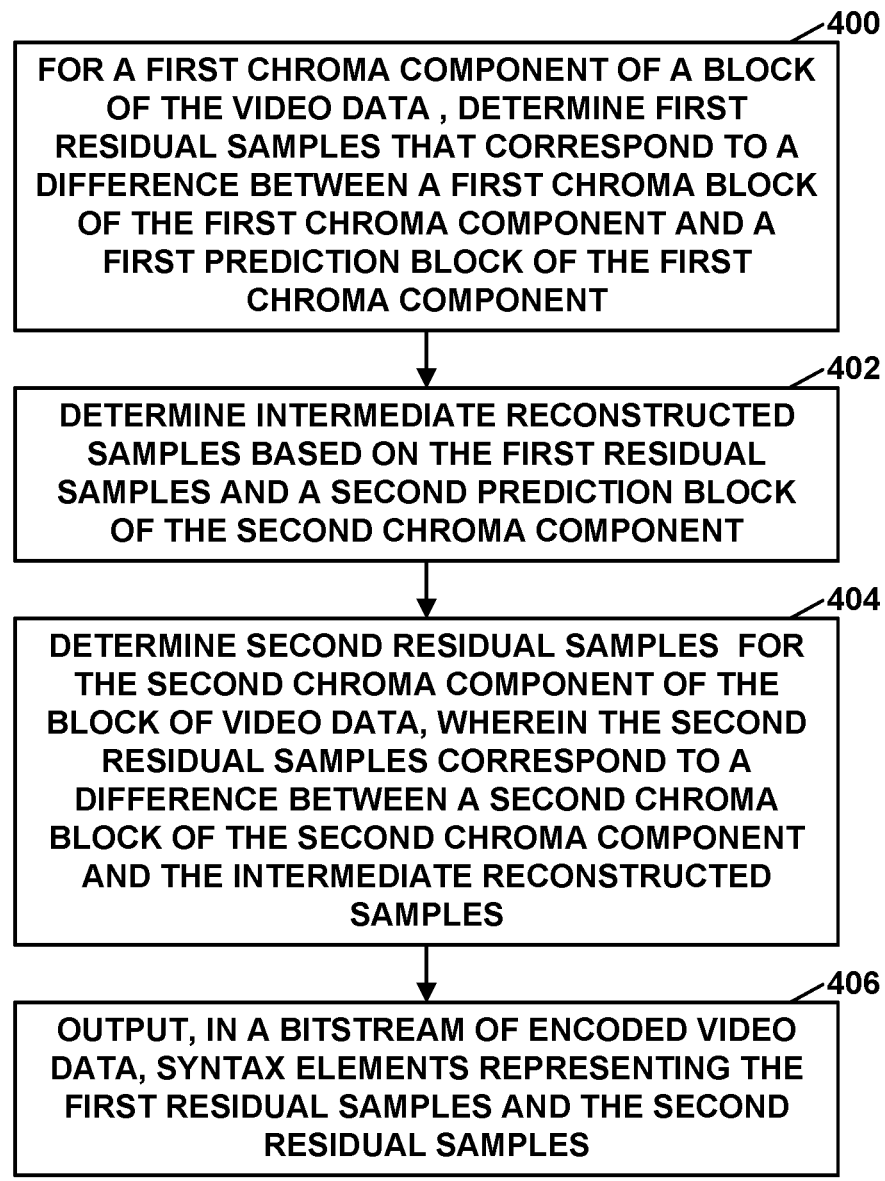
FIG. 7 is a flowchart illustrating an example of encoding video data.

FIG. 7 is a flowchart illustrating an example method for encoding a current block. The current block may be a current CU that includes a first chroma component, a second chroma component, and potentially other components such as a luma component. The current block may, for example, be coded in oner or both of a lossless coding mode or a joint coding of chroma residuals mode. Although described with respect to video encoder 200 (FIGS. 1 and 3), it should be understood that other devices may be configured to perform a method similar to that of FIG. 7.

For a first chroma component of a block of the video data, video decoder 300 determines first residual samples that correspond to a difference between a first chroma block of the first chroma component and a first prediction block of the first chroma component (400). Video decoder 300 determines intermediate reconstructed samples based on the first residual samples and a second prediction block of the second chroma component (402). Video decoder 300 determines second residual samples for the second chroma component of the block of video data, wherein the second residual samples correspond to a difference between a second chroma block of the second chroma component and the intermediate reconstructed samples (404). Video decoder 300 outputs, in a bitstream of encoded video data, syntax elements representing the first residual samples and the second residual samples (406). Video decoder 300 may, for example, output the bitstream for storage or transmission.

Figure 8:
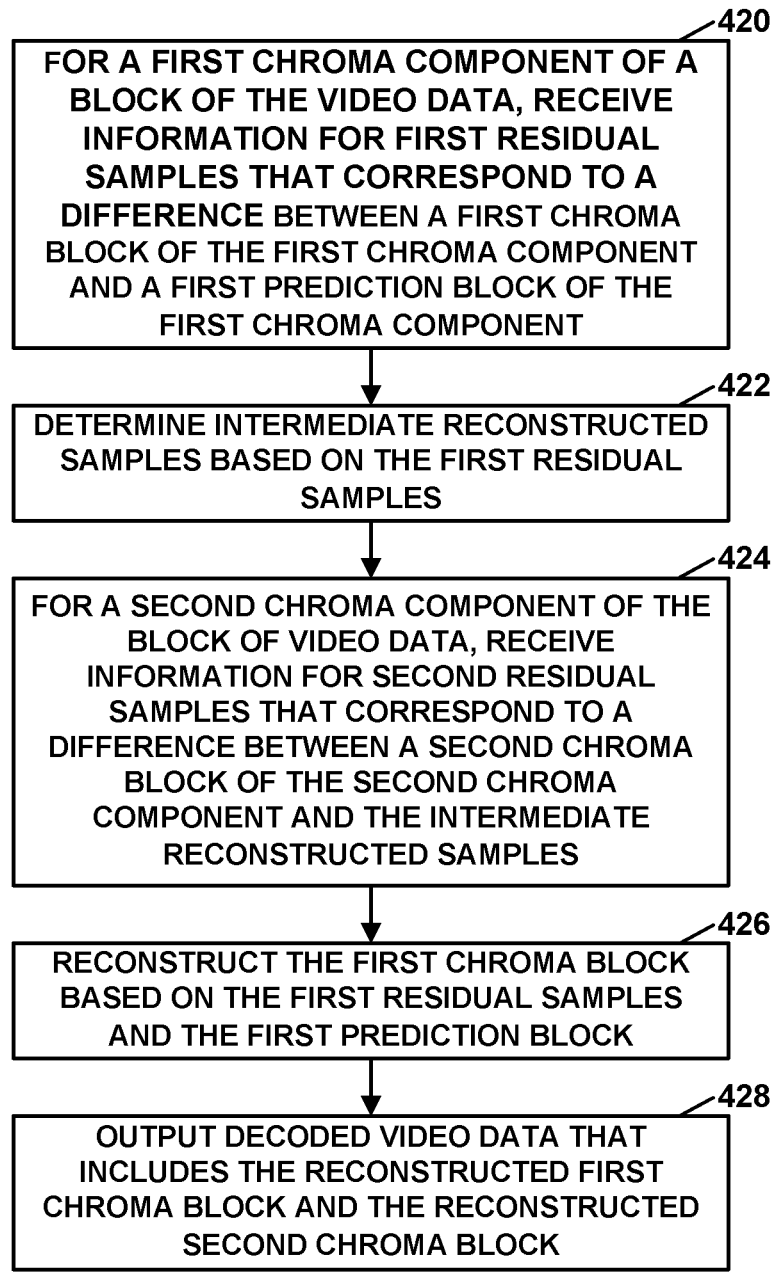
FIG. 8 is a flowchart illustrating an example of decoding video data.

FIG. 8 is a flowchart illustrating an example method for decoding a current block of video data. The current block may be a current CU that includes a first chroma component, a second chroma component, and potentially other components such as a luma component. The current block may, for example, be coded in oner or both of a lossless coding mode or a joint coding of chroma residuals mode. Although described with respect to video decoder 300 (FIGS. 1 and 4), it should be understood that other devices may be configured to perform a method similar to that of FIG. 8.

For a first chroma component of a block of the video data, video decoder 300 receives information for first residual samples that correspond to a difference between a first chroma block of the first chroma component and a first prediction block of the first chroma component (420). Video decoder 300 may obtain the first prediction block utilizing intra prediction, inter prediction, or some other such prediction mode.

Video decoder 300 determines intermediate reconstructed samples based on the first residual samples (422). To determine the intermediate reconstructed samples, video decoder 300 may, for example, determine the intermediate reconstructed samples based on the first residual samples and a second prediction block of the second chroma component. To determine the intermediate reconstructed samples, video decoder 300 may, for example determine the intermediate reconstructed samples, e.g., rec1Cr[x][y] as described above, according to the modes of Tables 3, 3.1, or 4-6 above.

For a second chroma component of the block of video data, video decoder 300 receives information for second residual samples that correspond to a difference between a second chroma block of the second chroma component and the intermediate reconstructed samples (424). As the intermediate reconstructed samples may typically be relatively close to the actual values for the second chroma block, the second residual samples can typically be coded with relatively few bits.

Video decoder 300 reconstructs the first chroma block based on the first residual samples and the first prediction block (426). To reconstruct the first chroma block based on the first residual samples and the first prediction block, video decoder 300 may for example add the first residual samples to the first prediction block. Video decoder 300 reconstructs the second chroma block based on the second residual samples and the intermediate reconstructed samples (428). To reconstruct the second chroma block based on the second residual samples and the intermediate reconstructed samples, video decoder 300 may, for example, add values of the second residual samples to corresponding values of the intermediate reconstructed samples. In instances where video decoder 300 is implementing lossless coding, the reconstructed first chroma block and reconstructed second chroma block may exactly match the corresponding original first chroma block and second chroma block without a need for any sort of filtering operations.

Video decoder 300 outputs decoded video data that includes the reconstructed first chroma block and the reconstructed second chroma block (430). Video decoder 300 may, for example, output the decoded video for display, output the decoded video data for long term storage to a non-volatile storage medium, or output the decoded video data to a buffer or other short term memory for use in the decoding of subsequent pictures of video.

The following clauses describe aspects of video encoder 200 and/or video decoder 300 and techniques that can be implemented by video encoder 200 and/or video decoder 300.

Aspect 1: A method of decoding video data includes receiving information for first residual samples for a first chroma component, wherein the first residual samples are based on a difference between a first chroma block of the first chroma component and a first prediction block of the first chroma component; determining intermediate samples based on the first residual samples; receiving information for second residual samples for a second chroma component, wherein the second residual samples are based on a difference between a second chroma block of the second chroma component and the intermediate samples, wherein the second chroma block and the first chroma block are associated together; reconstructing the first chroma block based on the first residual samples and the first prediction block; and reconstructing the second chroma block based on the second residual samples and the intermediate samples.

Aspect 2: The method of aspect 1, wherein the first residual samples represent the difference between the first chroma block of the first chroma component and the first prediction block of the first chroma component.

Aspect 3: The method of any of aspects 1 and 2, wherein determining the intermediate samples comprises determining the intermediate samples based on the first residual samples and a second prediction block of the second chroma component.

Aspect 4: The method of any of aspects 1-3, wherein the first chroma block and the second chroma block are of a same coding unit (CU).

Aspect 5: The method of any of aspects 1-4, wherein determining the intermediate samples comprises one of: for a first mode, rec1Cr[x][y]=Clip(predCr[x][y]+CSign*resJointC[x][y]>>1) or Clip(predCr[x][y]+CSign*k1*resJointC[x][y]), where rec1Cr[x][y] represents the intermediate samples, Clip is the clipping operation, predCr[x][y] represents samples of the second prediction block of the second chroma component, Csign is a sign value, resJointC[x][y] represents samples of the first residual samples, >> is the right-shift or divide by 2 operation, and k1 is a pre-stored or signaled parameter; for a second mode, rec1Cr[x][y]=Clip(predCr[x][y]+CSign*resJointC[x][y]), where rec1 Cr[x][y] represents the intermediate samples, Clip is the clipping operation, predCr[x][y] represents samples of the second prediction block of the second chroma component, Csign is a sign value, and resJointC[x][y] represents samples of the first residual samples; or for a third mode, rec1Cb[x][y]=Clip(predCb[x][y]+CSign*resJointC[x][y]>>1) or Clip(predCb[x][y] +CSign*k2*resJointC[x][y]), where rec1Cr[x][y] represents the intermediate samples, Clip is the clipping operation, predCb[x][y] represents samples of the second prediction block of the second chroma component, CSign is a signal value, resJointC[x][y] represents samples of the first residual samples, >> is the right-shift or divide by two operation, and k2 is a pre-stored or signaled parameter.

Aspect 6: A method of encoding video data includes signaling information for first residual samples for a first chroma component, wherein the first residual samples are based on a difference between a first chroma block of the first chroma component and a first prediction block of the first chroma component; determining intermediate samples based on the first residual samples; and signaling information for second residual samples for a second chroma component, wherein the second residual samples are based on a difference between a second chroma block of the second chroma component and the intermediate samples, and wherein the second chroma block and the first chroma block are associated together.

Aspect 7: The method of aspect 6, wherein the first residual samples represent the difference between the first chroma block of the first chroma component and the first prediction block of the first chroma component.

Aspect 8: The method of any of aspects 6 and 7, wherein determining the intermediate samples comprises determining the intermediate samples based on the first residual samples and a second prediction block of the second chroma component.

Aspect 9: The method of any of aspects 6-8, wherein the first chroma block and the second chroma block are of a same coding unit (CU).

Aspect 10: The method of any of aspects 6-9, wherein determining the intermediate samples comprises one of: for a first mode, rec1Cr[x][y]=Clip(predCr[x][y]+CSign*resJointC[x][y]>>1) or Clip(predCr[x][y]+CSign*k1*resJointC[x][y]), where rec1Cr[x][y] represents the intermediate samples, Clip is the clipping operation, predCr[x][y] represents samples of the second prediction block of the second chroma component, Csign is a sign value, resJointC[x][y] represents samples of the first residual samples, >> is the right-shift or divide by 2 operation, and k1 is a pre-stored or signaled parameter; for a second mode, rec1Cr[x][y]=Clip(predCr[x][y]+CSign*resJointC[x][y]), where rec1 Cr[x][y] represents the intermediate samples, Clip is the clipping operation, predCr[x][y] represents samples of the second prediction block of the second chroma component, Csign is a sign value, and resJointC[x][y] represents samples of the first residual samples; or for a third mode, rec1Cb[x][y]=Clip(predCb[x][y]+CSign*resJointC[x][y]>>1) or Clip(predCb[x][y] +CSign*k2*resJointC[x][y]), where rec1Cr[x][y] represents the intermediate samples, Clip is the clipping operation, predCb[x][y] represents samples of the second prediction block of the second chroma component, CSign is a signal value, resJointC[x][y] represents samples of the first residual samples, >> is the right-shift or divide by two operation, and k2 is a pre-stored or signaled parameter.

Aspect 11: A method of decoding video data includes receiving information for a set of values, wherein the set values are generated based on first set of residual samples for a first chroma block of a first chroma component and second set of residual samples for a second chroma block of a second chroma component, wherein the first chroma block and the second chroma block are associated; determining first intermediate samples based on the set of values; determining second intermediate samples based on the set of values; receiving information for first residual samples, wherein the first residual samples are based on a difference between the first chroma block of the first chroma component and the first intermediate samples; receiving information for second residual samples, wherein the second residual samples are based on a difference between the second chroma block of the second chroma component and the second intermediate samples; reconstructing the first chroma block based on the first residual samples and the first intermediate samples; and reconstructing the second chroma block based on the second residual samples and the second intermediate samples.

Aspect 12: The method of aspect 11, wherein determining the first intermediate samples comprises determining the first intermediate samples based on the set of values and a first prediction block of the first color component, and wherein determining the second intermediate samples comprises determining the second intermediate samples based on the set of values and a second prediction block of the second color component.

Aspect 13: The method of any of aspects 11 and 12, wherein the first chroma block and the second chroma block are of a same coding unit (CU).

Aspect 14: The method of any of aspects 11-13, wherein determining first intermediate samples based on the set of values and determining second intermediate samples based on the set of values comprises one of: for a first mode, rec1Cb[x][y]=Clip(predCb[x][y]+resJointC[x][y]) and rec1Cr[x][y]=Clip(predCr[x][y]+CSign*resJointC[x][y]>>1) or rec1Cr[x][y]=Clip(predCr[x][y]+CSign*k1*resJointC[x][y]), where rec1Cb[x][y] represents the first intermediate samples, Clip is the clipping operation, predCb[x][y] represents the first prediction block, resJointC[x][y] represents the set of values, rec1Cr[x][y] represents second intermediate samples, predCr[x][y] represents the second prediction block, CSign is a sign value, >> is the right-shift or divide by 2 operation, and k1 is a pre-stored or signaled parameter; for a second mode, rec1Cb[x][y]=Clip(predCb[x][y]+resJointC[x][y]) and rec1Cr[x][y]=Clip(predCr[x][y]+CSign*resJointC[x][y]), where rec1Cb[x][y] represents the first intermediate samples, Clip is the clipping operation, predCb[x][y] represents the first prediction block, resJointC[x][y] represents the set of values, rec1Cr[x][y] represents second intermediate samples, predCr[x][y] represents the second prediction block, and CSign is a sign value; or for a third mode, rec1Cb[x][y]=Clip(predCb[x][y]+CSign*resJointC[x][y]>>1) and rec1Cr[x][y]=Clip(predCr[x][y]+CSign*resJointC[x][y]) or rec1Cb[x][y]=Clip(predCb[x][y]+CSign*k2*resJointC[x][y]), where rec1Cb[x][y] represents the first intermediate samples, Clip is the clipping operation, predCb[x][y] represents the first prediction block, resJointC[x][y] represents the set of values, rec1Cr[x][y] represents second intermediate samples, predCr[x][y] represents the second prediction block, CSign is a sign value, >> is the right-shift or divide by 2 operation, and k2 is a pre-stored or signaled parameter.

Aspect 15: A method of encoding video data includes generating a set of values based on first set of residual samples for a first chroma component and second set of residual samples for a second chroma component, wherein the first set of residual samples are based on a difference between a first chroma block of the first chroma component and a first prediction block and the second set of residual samples are based on a difference between a second chroma block for the second chroma component and a second prediction block, wherein the first chroma block and the second chroma block are associated; signaling information for the set of values; determining first intermediate samples based on the set of values; determining second intermediate samples based on the set of values; signaling information for first residual samples, wherein the first residual samples are based on a difference between the first chroma block of the first chroma component and the first intermediate samples; and signaling information for second residual samples, wherein the second residual samples are based on a difference between the second chroma block of the second chroma component and the second intermediate samples.

Aspect 16: The method of aspect 15, wherein determining the first intermediate samples comprises determining the first intermediate samples based on the set of values and a first prediction block of the first color component, and wherein determining the second intermediate samples comprises determining the second intermediate samples based on the set of values and a second prediction block of the second color component.

Aspect 17: The method of any of aspects 15 and 16, wherein the first chroma block and the second chroma block are of a same coding unit (CU).

Aspect 18: The method of any of aspects 15-17, wherein generating the set of values comprises one of for a first mode, resJointC[x][y]=(4*resCb[x][y]+2*CSign*resCr[x][y])/5 or resJointC[x][y]=(4*resCb[x][y]+4*k1*CSign*resCr[x][y])/5, where resJointC[x][y] represents the set of values, resCb[x][y] represents the first set of residual samples, CSign is a sign value, resCr[x][y] represents the second set of residual samples, and k1 is a pre-stored or signaled value; for a second mode, resJointC[x][y]=(resCb[x][y]+CSign*resCr[x][y])/2 or resJointC[x][y]=(resCb[x][y]+CSign*resCr[x][y])/2, where resJointC[x][y] represents the set of values, resCb[x][y] represents the first set of residual samples, CSign is a sign value, resCr[x][y] represents the second set of residual samples, and k1 is a pre-stored or signaled value; or for a third mode, resJointC[x][y]=(4*resCr[x][y]+2*CSign*resCb[x][y])/5 or resJointC[x][y]=(4*resCr[x][y]+4*k2*CSign*resCb[x][y])/5, where resJointC[x][y] represents the set of values, resCr[x][y] represents the first set of residual samples, CSign is a sign value, resCb[x][y] represents the second set of residual samples, and k2 is a pre-stored or signaled value.

Aspect 19: The method of any of aspects 15-18, wherein determining first intermediate samples based on the set of values and determining second intermediate samples based on the set of values comprises one of: for a first mode, rec1Cb[x][y]=Clip(predCb[x][y]+resJointC[x][y]) and rec1Cr[x][y]=Clip(predCr[x][y]+CSign*resJointC[x]

[y]>>1) or rec1Cr[x][y]=Clip(predCr[x][y]+CSign*k1*resJointC[x][y]), where rec1Cb[x][y] represents the first intermediate samples, Clip is the clipping operation, predCb[x][y] represents the first prediction block, resJointC[x][y] represents the set of values, rec1Cr[x][y] represents second intermediate samples, predCr[x][y] represents the second prediction block, CSign is a sign value, >> is the right-shift or divide by 2 operation, and k1 is a pre-stored or signaled parameter; for a second mode, rec1Cb[x][y]=Clip(predCb[x][y]+resJointC[x][y]) and rec1Cr[x][y]=Clip(predCr[x][y]+CSign*resJointC[x][y]), where rec1Cb[x][y] represents the first intermediate samples, Clip is the clipping operation, predCb[x][y] represents the first prediction block, resJointC[x][y] represents the set of values, rec1Cr[x][y] represents second intermediate samples, predCr[x][y] represents the second prediction block, and CSign is a sign value; or for a third mode, rec1Cb[x][y]=Clip(predCb[x][y]+CSign*resJointC[x][y]>>1) and rec1Cr[x][y]=Clip(predCr[x][y]+CSign*resJointC[x][y]) or rec1Cb[x][y]=Clip(predCb[x][y]+CSign*k2*resJointC[x][y]), where rec1Cb[x][y] represents the first intermediate samples, Clip is the clipping operation, predCb[x][y] represents the first prediction block, resJointC[x][y] represents the set of values, rec1Cr[x][y] represents second intermediate samples, predCr[x][y] represents the second prediction block, CSign is a sign value, >> is the right-shift or divide by 2 operation, and k2 is a pre-stored or signaled parameter.

Aspect 20: A device for decoding video data includes a memory configured to store video data; and processing circuitry, coupled to the memory, and configured to perform the method of any of claims 1-5 and 11-14.

Aspect 21: A device for encoding video data includes a memory configured to store video data; and processing circuitry, coupled to the memory, and configured to perform the method of any of claims 6-10 and 15-19.

Aspect 22: The device of any of aspects 20 or 21, further comprising a display configured to display decoded video data.

Aspect 23: The device of any of aspects 20-22, wherein the device comprises one or more of a camera, a computer, a mobile device, a broadcast receiver device, or a set-top box.

Aspect 24: A computer-readable storage medium storing instructions thereon that when executed cause one or more processors to perform the method of any of aspects 1-5 or 11-14.

Aspect 25: A device for coding video data, the device comprising means for performing the method of any of aspects 1-5 or 11-14.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
receiving information for first residual samples for a first chroma component of a block of the video data, wherein the first residual samples correspond to a difference between a first chroma block of the first chroma component and a first prediction block of the first chroma component;
determining a second prediction block of a second chroma component of the block using at least one of intra prediction or inter prediction;
determining intermediate reconstructed samples based on the first residual samples and the second prediction block, wherein the intermediate reconstructed samples correspond to the second prediction block added to corresponding scaled samples of the first residual samples;
receiving information for second residual samples for the second chroma component of the block of video data, wherein the second residual samples correspond to a difference between a second chroma block of the second chroma component and the intermediate reconstructed samples;
reconstructing the first chroma block based on the first residual samples and the first prediction block;
reconstructing the second chroma block based on the second residual samples and the intermediate reconstructed samples; and
outputting decoded video data comprising the reconstructed first chroma block and the reconstructed second chroma block.

2. The method of claim 1, wherein the block of the video data is coded in a lossless coding mode.

3. The method of claim 1, wherein the first chroma block and the second chroma block are of a same coding unit (CU).

4. The method of claim 1, wherein reconstructing the second chroma block based on the second residual samples and the intermediate reconstructed samples comprises adding values of the second residual samples to corresponding values of the intermediate reconstructed samples.

5. The method of claim 1, further comprising:
determining that the block of the video data is encoded in a joint coding of chroma residuals mode.

6. The method of claim 1, wherein
reconstructing the first chroma block based on the first residual samples and the first prediction block comprises adding the first reconstructed chroma block to the first prediction block of the first chroma component to generate the first chroma block;
reconstructing the second chroma block based on the second residual samples and the intermediate reconstructed samples comprises adding values of the second residual samples to corresponding values of the intermediate reconstructed samples.

7. The method of claim 1, wherein determining the intermediate reconstructed samples comprises determining the intermediate reconstructed samples according to one of the following equations:
rec1Cr[x][y]=Clip(predCr[x][y]+CSign*resJointC[x][y]>>1) or
Clip(predCr[x][y]+CSign*k1*resJointC[x][y]), wherein
rec1Cr[x][y] represents the intermediate reconstructed samples,
Clip is a clipping operation,
predCr[x][y] represents samples of a second prediction block of the second chroma component,
Csign is a sign value,
resJointC[x][y] represents samples of the first residual samples,
>> is a right-shift or divide by 2 operation, and
k1 is a pre-stored or signaled parameter.

8. The method of claim 1, wherein determining the intermediate reconstructed samples comprises determining the intermediate reconstructed samples according to the equation:
rec1Cr[x][y]=Clip(predCr[x][y]+CSign*resJointC[x][y]), wherein
rec1Cr[x][y] represents the intermediate reconstructed samples,
Clip is a clipping operation,
predCr[x][y] represents samples of a second prediction block of the second chroma component,
Csign is a sign value, and
resJointC[x][y] represents samples of the first residual samples.

9. The method of claim 1, wherein determining the intermediate reconstructed samples comprises determining the intermediate reconstructed samples according to one of the following equations:
rec1Cb[x][y]=Clip(predCb[x][y]+CSign*resJointC[x][y]>>1), or
Clip(predCb[x][y]+CSign*k2*resJointC[x][y]), wherein
rec1Cr[x][y] represents the intermediate reconstructed samples,
Clip is a clipping operation,
predCb[x][y] represents samples of a second prediction block of the second chroma component,
CSign is a signal value,
resJointC[x][y] represents samples of the first residual samples,
>> is a right-shift or divide by two operation, and
k2 is a pre-stored or signaled parameter.

10. A method of encoding video data, the method comprising:
determining first residual samples for a first chroma component of a block of the video data, wherein the first residual samples correspond to a difference between a first chroma block of the first chroma component and a first prediction block of the first chroma component;
determining a second prediction block of a second chroma component of the block using at least one of intra prediction or inter prediction;
determining intermediate reconstructed samples based on the first residual samples and the second prediction block of the second chroma component, wherein the intermediate reconstructed samples correspond to the second prediction block added to corresponding scaled samples of the first residual samples;
determining second residual samples for the second chroma component of the block of video data, wherein the second residual samples correspond to a difference between a second chroma block of the second chroma component and the intermediate reconstructed samples; and
outputting, in a bitstream of encoded video data, syntax elements representing the first residual samples and the second residual samples.

11. The method of claim 10, wherein the block of the video data is coded in a lossless coding mode.

12. The method of claim 10, wherein the first chroma block and the second chroma block are of a same coding unit (CU).

13. The method of claim 10, wherein
determining the intermediate reconstructed samples based on the first residual samples and the second prediction block of the second chroma component comprises adding values of the first residual samples to values of samples of the second prediction block.

14. The method of claim 10, further comprising:
determining that the block of the video data is encoded in a joint coding of chroma residuals mode.

15. A device for decoding video data, the device comprising:
a memory configured to store the video data;
one or more processors implemented in circuitry and configured to:
receive information for first residual samples for a first chroma component of a block of the video data, wherein the first residual samples correspond to a difference between a first chroma block of the first chroma component and a first prediction block of the first chroma component;
determine a second prediction block of a second chroma component of the block using at least one of intra prediction or inter prediction;
determine intermediate reconstructed samples based on the first residual samples and the second prediction block, wherein the intermediate reconstructed samples correspond to the second prediction block added to corresponding scaled samples of the first residual samples;
receive information for second residual samples for the second chroma component of the block of video data, wherein the second residual samples correspond to a difference between a second chroma block of the second chroma component and the intermediate reconstructed samples;
reconstruct the first chroma block based on the first residual samples and the first prediction block;
reconstruct the second chroma block based on the second residual samples and the intermediate reconstructed samples; and
output decoded video data comprising the reconstructed first chroma block and the reconstructed second chroma block.

16. The device of claim 15, wherein the block of the video data is coded in a lossless coding mode.

17. The device of claim 15, wherein the first chroma block and the second chroma block are of a same coding unit (CU).

18. The device of claim 15, wherein to reconstruct the second chroma block based on the second residual samples and the intermediate reconstructed samples, the one or more processors are further configured to add values of the second residual samples to corresponding values of the intermediate reconstructed samples.

19. The device of claim 15, wherein the one or more processors are further configured to:
determine that the block of the video data is encoded in a joint coding of chroma residuals mode.

20. The device of claim 15, wherein
to reconstruct the first chroma block based on the first residual samples and the first prediction block, the one or more processors are further configured to adding the first reconstructed chroma block to the first prediction block of the first chroma component to generate the first chroma block;
to reconstruct the second chroma block based on the second residual samples and the intermediate reconstructed samples, the one or more processors are further configured to add values of the second residual samples to corresponding values of the intermediate reconstructed samples.

21. The device of claim 15, wherein to determine the intermediate reconstructed samples, the one or more processors are further configured to determine the intermediate reconstructed samples according to one of the following equations:
$rec1Cr[x][y]=Clip(predCr[x][y]+CSign*resJointC[x][y]>>1)$ or
$Clip(predCr[x][y]+CSign*k1*resJointC[x][y])$, wherein
$rec1Cr[x][y]$ represents the intermediate reconstructed samples,
Clip is a clipping operation,
$predCr[x][y]$ represents samples of a second prediction block of the second chroma component,
Csign is a sign value,
$resJointC[x][y]$ represents samples of the first residual samples,
$>>$ is a right-shift or divide by 2 operation, and
k1 is a pre-stored or signaled parameter.

22. The device of claim 15, wherein to determine the intermediate reconstructed samples, the one or more processors are further configured to determine the intermediate reconstructed samples according to one of the following equations:
$rec1Cr[x][y]=Clip(predCr[x][y]+CSign*resJointC[x][y])$, wherein
$rec1Cr[x][y]$ represents the intermediate reconstructed samples,
Clip is a clipping operation,
$predCr[x][y]$ represents samples of a second prediction block of the second chroma component,
Csign is a sign value, and
$resJointC[x][y]$ represents samples of the first residual samples.

23. The device of claim 15, wherein to determine the intermediate reconstructed samples, the one or more processors are further configured to determine the intermediate reconstructed samples according to one of the following equations:
$rec1Cb[x][y]=Clip(predCb[x][y]+CSign*resJointC[x][y]>>1)$, or
$Clip(predCb[x][y]+CSign*k2*resJointC[x][y])$, wherein
$rec1Cr[x][y]$ represents the intermediate reconstructed samples,
Clip is a clipping operation,
$predCb[x][y]$ represents samples of a second prediction block of the second chroma component,
CSign is a signal value,
$resJointC[x][y]$ represents samples of the first residual samples,
$>>$ is a right-shift or divide by two operation, and
k2 is a pre-stored or signaled parameter.

24. The device of claim 15, further comprising:
a display configured to display decoded video data.

25. The device of claim 15, wherein the device comprises one or more of a camera, a computer, a mobile device, a broadcast receiver device, or a set-top box.

26. A device of encoding video data, the device comprising:
a memory configured to store video data;
one or more processors implemented in circuitry and configured to:
determine first residual samples for a first chroma component of a block of the video data, wherein the first residual samples correspond to a difference between a first chroma block of the first chroma component and a first prediction block of the first chroma component;

determine a second prediction block of a second chroma component of the block using at least one of intra prediction or inter prediction;

determine intermediate reconstructed samples based on the first residual samples and the second prediction block of the second chroma component, wherein the intermediate reconstructed samples correspond to the second prediction block added to corresponding scaled samples of the first residual samples;

determine second residual samples for the second chroma component of the block of video data, wherein the second residual samples correspond to a difference between a second chroma block of the second chroma component and the intermediate reconstructed samples; and output, in a bitstream of encoded video data, syntax elements representing the first residual samples and the second residual samples.

27. The device of claim 26, wherein the block of the video data is coded in a lossless coding mode.

28. The device of claim 26, wherein to determine the intermediate reconstructed samples based on the first residual samples and the second prediction block of the second chroma component, the one or more processors are further configured to add values of the first residual samples to values of samples of the second prediction block.

29. The method of claim 1, wherein the corresponding scaled samples of the first residual samples correspond to the first residual samples multiplied by a sign value and a scaling factor.

30. The device of claim 15, wherein the corresponding scaled samples of the first residual samples correspond to the first residual samples multiplied by a sign value and a scaling factor.

* * * * *